United States Patent [19]
Gooch et al.

[11] Patent Number: 4,860,861
[45] Date of Patent: Aug. 29, 1989

[54] TORQUE CONVERTER LOCK-UP AND DISCONNECT CLUTCH STRUCTURE

[75] Inventors: Douglas C. Gooch, Galesburg; Timothy J. Morscheck, Kalamazoo, both of Mich.

[73] Assignee: Eaton Corporation, Cleveland, Ohio

[21] Appl. No.: 98,104

[22] Filed: Sep. 17, 1987

[51] Int. Cl.⁴ ............................................. F16D 33/00
[52] U.S. Cl. ................................ 192/3.26; 192/3.27; 192/113 B; 192/3.28; 74/731
[58] Field of Search ................ 74/731; 192/3.25, 3.26, 192/3.27, 3.28, 3.3, 113 B

[56] References Cited

U.S. PATENT DOCUMENTS

| | | | |
|---|---|---|---|
| 2,544,551 | 3/1951 | Black | 192/3.26 |
| 2,562,464 | 7/1951 | Jandasek | 192/3.25 X |
| 2,642,168 | 6/1953 | Black et al. | 192/3.26 |
| 2,702,616 | 2/1955 | Black et al. | 192/3.26 |
| 2,727,601 | 12/1955 | Shurts | 192/3.26 |
| 2,750,018 | 6/1956 | Dundore | 192/3.26 |
| 3,000,230 | 9/1961 | Froslie | 74/472 |
| 3,367,211 | 2/1968 | Borman et al. | 74/677 |
| 3,478,851 | 11/1969 | Smyth et al. | 192/3.55 |
| 3,593,596 | 7/1971 | Race et al. | 74/720 |
| 3,747,436 | 7/1973 | Hause | 192/3.27 X |
| 3,838,611 | 10/1974 | Koivunen | 74/731 X |
| 4,351,205 | 9/1982 | Fischer | 74/866 |
| 4,361,060 | 11/1982 | Smyth | 74/866 |
| 4,430,911 | 2/1984 | Morscheck | 74/868 |
| 4,545,264 | 10/1985 | Hau et al. | 74/688 |
| 4,673,071 | 6/1987 | Moroto et al. | 192/3.25 X |
| 4,724,942 | 2/1988 | Casse et al. | 192/113 B X |
| 4,784,019 | 11/1988 | Morscheck | 74/720 |

Primary Examiner—Leslie A. Braun
Assistant Examiner—Christopher C. Campbell
Attorney, Agent, or Firm—H. D. Gordon

[57] ABSTRACT

A torque converter lock-up and disconnect clutch assembly (10) for an automatic mechanical transmission system (12) of the type comprising a fluid torque converter (20) drivingly interposed a drive engine (16) and a mechanical change gear transmission (14), preferably of the type utilizing a power synchronizing device (30), is provided. The torque converter lock-up and disconnect clutch structure includes an independently engagable and disengagable torque converter disconnect friction clutch (24) and torque converter lock-up friction clutch (26). A first connecting member (74) is fixed for rotation with the transmission input shaft (72) and a second connecting member (79) is rotationally fixed to the torque converter turbine (60). A first friction clutch (24) selectively engages and disengages the first and second connecting members and a second friction clutch (26) selectively engages and disengages the second connecting member and the engine driven shroud (58).

14 Claims, 4 Drawing Sheets

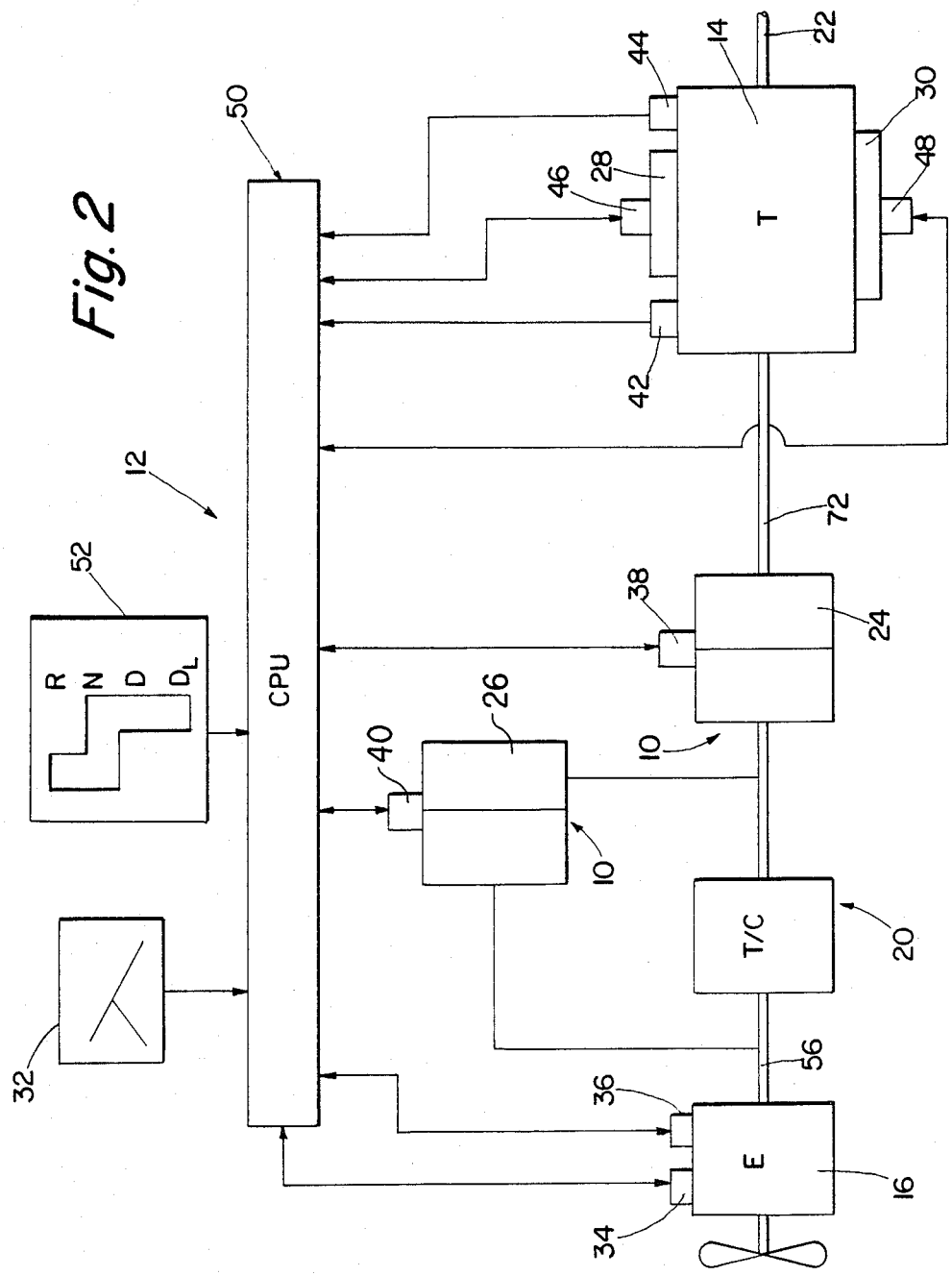

TORQUE CONVERTER LOCK-UP AND DISCONNECT CLUTCH STRUCTURE

RELATED APPLICATIONS

This application is related to copending U.S. patent application Ser. No. 006,303 filed Jan. 15, 1987 now U.S. Pat. No. 4,784,019 and assigned to the Assignee of this application which is a continuation of Ser. No. 719,180, filed Apr. 3, 1985 now abandoned.

BACKGROUND OF THE INVENTION

1. Field of the Invention

The present invention relates to automatic mechanical transmission systems including a throttle controlled engine, a mechanical change gear transmission and a fluid coupling, such as torque converter, interposed the engine and transmission. In particular, the present invention relates to a torque converter lock-up and disconnect clutch structure for such system. More particularly, the present invention relates to a torque converter lock-up and disconnect clutch structure for an automatic mechanical transmission system utilizing a mechanical change gear transmission and a power synchronizer mechanism which allows minimizing of the inertia on the transmission input shaft and balancing of centrifugal forces.

2. Description of the Prior Art

Mechanical change gear transmissions, i.e. transmissions shifted by engaging selected positive jaw clutches, as opposed to friction clutches, are well known in the art. Examples of such transmissions may be seen by reference to U.S. Pat. Nos. 3,105,395; 3,611,823; 4,152,949 and 4,194,410, the disclosures of which are hereby incorporated by reference.

Automatic mechanical transmission systems comprising mechanical transmissions and controls and actuators to automatically shift same, usually electronically controlled in accordance with sensed inputs and predetermined logic rules, are known. Examples of such systems may be seen by reference to U.S. Pat. Nos. 4,648,290; 4,595,986; 4,361,060; 4,140,031 and 4,081,065, the disclosures of which hereby incorporated by reference. Such systems may also be seen by reference to SAE Paper No. 831776 titled "AUTOMATED MECHANICAL TRANSMISSION CONTROLS", the disclosure of which is hereby incorporated by reference.

Automatic transmission systems including a torque converter drivingly interposed a drive engine and a mechanical change gear transmission and/or including torque converter by-pass or lockup devices are also known as may be seen by reference to U.S. Pat. Nos. 3,593,596; 4,261,216; 4,271,724; 4,351,205 and 4,375,171, the disclosures of which are hereby incorporated by reference.

Automatic mechanical transmission systems utilizing power synchronizer devices, i.e. devices independent of engine speed to provide input shaft braking and acceleration, and not manipulation of engine speed, to synchronize the transmission jaw clutch members are known in the prior art. The acceleration portions of such devices are often output shaft driven through a speed increasing gear train and/or driven by an auxiliary motor. Examples of such systems may be seen by reference to U.S. Pat. Nos. 3,478,851; 4,023,443; 4,140,031 and 4,614,126, the disclosures of which are hereby incorporated by reference.

While automatic transmissions are well known and widely used in many applications, automatic transmissions, especially for use in heavy duty vehicles such as heavy trucks, are not totally satisfactory as the same, or substantially the same, transmission was not usable, with a minimum of modification, for both manual and automatic use, the advantages of torque converter starting and/or a non-slipping connection between the engine and transmission at higher vehicle speeds/drive ratios was not available and/or the speed of synchronizing the positive jaw clutches was limited to the response times of the engine.

SUMMARY OF THE INVENTION

In aocordance with the present invention, the drawbacks of the prior art are minimized or overcome by the provision of an automatic mechanical transmission system utilizing a mechanical change gear transmission of a structure identical or substantially identical to the structure of transmissions intended for manual usage, providing the advantages of a torque converter for vehicle start-ups and the advantages of non-slipping connection between the engine and transmission at higher vehicle speeds/gear ratios and providing relatively rapid synchronization of the transmission positive jaw clutches.

The above is accomplished by providing an automatic mechanical transmission system based upon the same, or substantially the same, mechanical change gear transmission utilized for manual transmission systems. This does, of course, allow the same basic transmission to be utilized for both manual and automatic transmission systems and results in manufacturing, inventory and maintenance cost savings. To the transmission is added, if necessary, shifting mechanisms suitable for automatic control by solenoids or the like. An example of such a shifting mechanism may be seen by reference to above-mentioned U.S. Pat. No. 4,360,060 and U.S. Pat. No. 4,445,393, the disclosures of which is hereby incorporated by reference. A power synchronizer mechanism as disclosed in above-mentioned U.S. Pat. Nos. 4,614,126; 3,478,851 or 4,023,443 is also added for synchronizing the transmission positive jaw clutches. It has been found, by way of example, that in one typical compound, nine-speed mechanical change gear transmission equipped with a power synchronizer mechanism, the input shaft may be accelerated and decelerated, for downshifts and upshifts, respectively, at about 2000 RPM/second. This compares very favorably with the expected rates of about 1500 RPM/second and 700 RPM/second, for acceleration and deceleration, respectively, of a transmission input shaft by utilizing only engine speed manipulation. Additionally, when utilizing a power synchronizer mechanism, the input shaft speed is not limited to the maximum governed engine speed as is the case when synchronizing with engine speed manipulation.

A torque converter is drivingly interposed the drive engine and transmission. A torque converter lock-up and disconnect clutch structure is provided comprising a first and a second separate, independently operable, clutches, preferably friction clutches, for coupling the torque converter driven member or turbine to the transmission input shaft and for coupling the torque converter input or impeller (i.e. the engine output) to the transmission input shaft, respectively.

The torque converter is drivingly interconnected between the engine and transmission only when the first coupling is engaged and the second disengaged. The torque converter is locked-up, i.e. the turbine driven directly by the engine, when the second clutch is engaged. The transmission is driven directly from the engine, whenever the second clutch is engaged simultaneously with the first clutch.

When the first coupling is disengaged, regardless of the condition of the second coupling, the transmission input shaft is disconnected from the engine torque and also from the inertia of the torque converter and from the inertia of the second coupling allowing the jaw clutches to be easily disengaged, the power synchronizer mechanism to act quickly due to relatively low inertia on the input shaft and also allowing a selected gear to be pre-engaged with the vehicle at rest and in the drive condition.

Accordingly, it is an object of the present invention to provide a new and improved automatic mechanical transmission system.

Another object of the present invention is to provide a new and improved automatic mechanical transmission system utilizing a torque converter drivingly interposed the engine and mechanical transmission and further utilizing an improved torque converter lock-up and disconnect clutch structure.

These and other objects and advantages of the present invention will become apparent from a reading of the description of the preferred embodiment taken with the drawings.

BRIEF DESCRIPTION OF THE DRAWINGS

FIG. 2 is a schematic illustration of the automatic mechanical transmission system of the present invention.

DESCRIPTION OF THE PREFERRED EMBODIMENT

Figure 1:
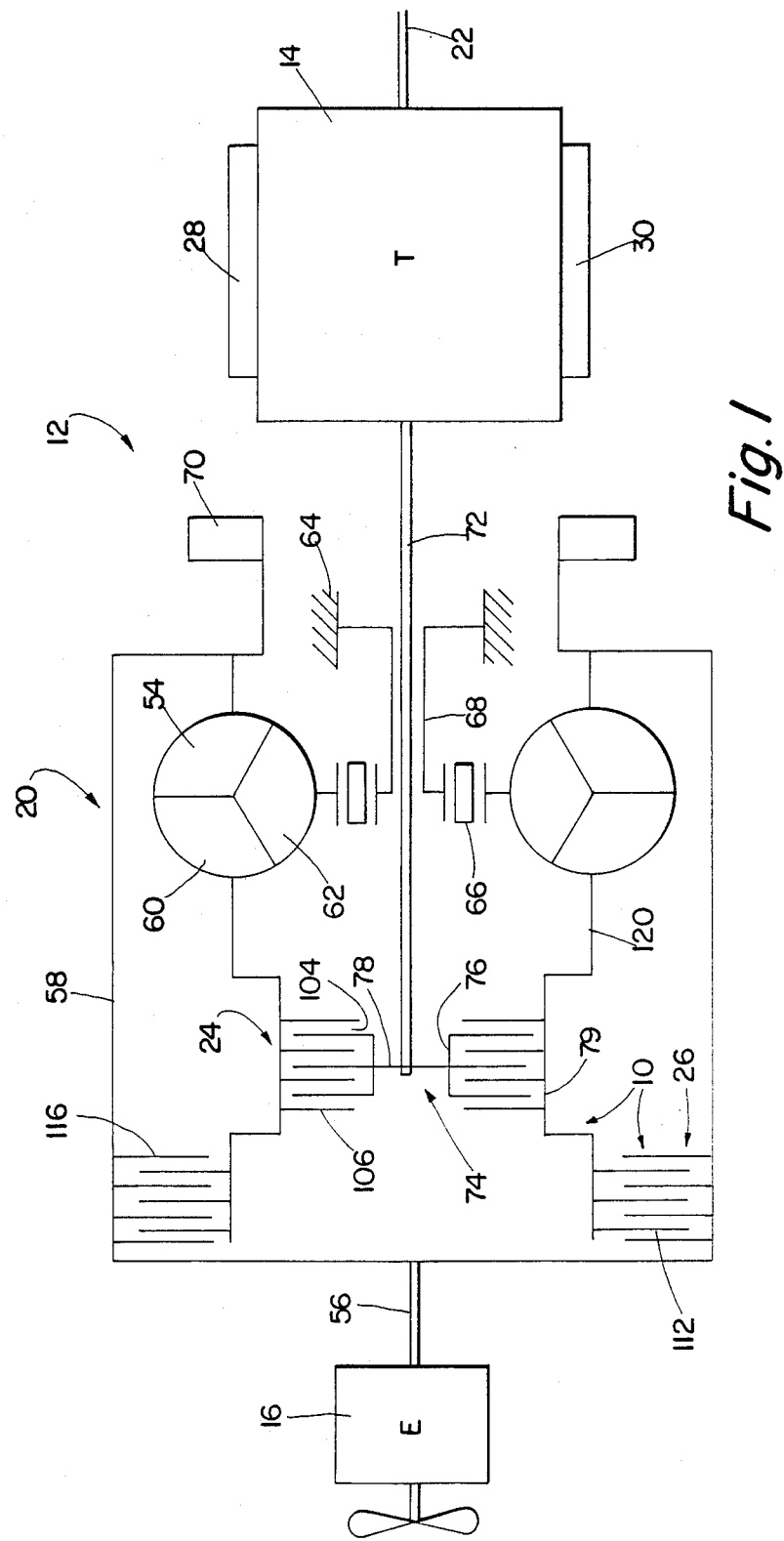
FIG. 1 is a schematic view of the torque converter and torque converter disconnect and by-pass clutch structure of the present invention.

Certain terminology will be used in the following description for convenience and reference only and will not be limiting. The words "upwardly", "downwardly", "rightwardly" and "leftwardly" will designate directions in the drawings to which reference is made. The words "inwardly" and "outwardly" will refer to directions toward and away from, respectively, the geometric center of the described device and/or designated parts thereof. Said terminology will include the words above specifically mentioned, derivatives thereof, and words of a similar import.

The torque converter lock-up and disconnect clutch assembly 10 of the present invention, and an automatic mechanical transmission system 12 utilizing same, are schematically illustrated in FIGS. 1 and 2. The term "automatic mechanical transmission system" as used herein, shall mean a system comprising at least a throttle device controlled heat engine, a multi-speed jaw clutch type change gear transmission, a non-positive coupling device such as a master friction clutch and/or a fluid coupling interposed the engine and the transmission and a control unit for automatically controlling same. Such systems will, of course, also include sensors and/or actuators for sending input signals to and/or receiving command output signals from the control unit.

The automatic mechanical transmission system 12 of the present invention is intended for use on a land vehicle, such as a heavy duty truck, but is not limited to such use. The automatic mechanical transmission system 12 illustrated includes an automatic multi-speed mechanical change gear transmission 14 driven by a prime mover throttle device controlled engine 16 (such as a diesel engine) through a fluid coupling or torque converter assembly 20. The output of the automatic transmission 14 is an output shaft 22 which is adapted for driving connection to an appropriate vehicle component such as the differential of a drive axle, a transfer case, or the like as is well known in the prior art.

As will be discussed in greater detail below, the torque converter lock-up and disconnect clutch assembly 10 includes two separate, independently engagable clutches, preferably friction clutches, a torque converter disconnect clutch 24 and a torque converter lock-up or by-pass clutch 26. The transmission 14 includes a transmission operating mechanism 28 which is preferably in the format of a pressurized fluid actuated shifting assembly of the type disclosed in above-mentioned U.S. Pat. No. 4,445,393. The transmission also preferably includes a power synchronizer assembly 30 which may be of the type illustrated and disclosed in above-mentioned U.S. Pat. Nos. 3,478,851, 4,023,443 or 4,614,126.

The above-mentioned power train components are acted upon and monitored by several devices, each of which are known in the prior art and will be discussed in greater detail below. These devices may include a throttle position monitor assembly 32, which senses the position of the operator controlled vehicle throttle pedal or other fuel throttling device, a throttle control 34 which controls the supply of fuel to the engine, an engine speed sensor assembly 36 which senses the rotational speed of the engine, a torque converter disconnect clutch operator 38 which operates the torque converter disconnect clutch 24, a torque converter lock-up clutch operator 40 which operates the torque converter by-pass clutch 26, a transmission input shaft speed sensor 42, a transmission output shaft speed sensor 44, a transmission shifting mechanism operator 46 for controlling the operation of transmission shifting mechanism 28 and/or a power synchronizer mechanism actuator 48 for controlling the operation of power synchronizer mechanism 30.

The above-mentioned devices supply information to and/or accept commands from an electronic central processing unit ("CPU") 50. The central processing unit or controller 50 is preferably based on a digital microprocessor, the specific configuration and structure of which form no part of the present invention. The central processing unit 50 also receives information from a shift control or mode selector assembly 52 by which the operator may select a reverse (R), a neutral (N) or several forward drive (D, $D_L$) modes of operation of the vehicle. Typically, the D mode of operation is for on-highway vehicle travel while the $D_L$ mode of operation is for off-road operation. Alternatively, a separate on-highway/off-highway selector switch may be provided. An electrical power source (not shown) and/or source of pressurized fluid (not shown) provides the electrical and/or pneumatic power to the various sensing, operating and/or processing unit. Drive train components and controls therefor of the type described above are known in the prior art and may be appreciated in greater detail by reference to U.S. Pat. Nos. 3,776,048;

3,038,889; 4,226,295 and 4,361,060, the disclosures of which are incorporated by reference.

As is known, the central processing unit 50 receives inputs from the various sensors and/or operating devices. In addition to these direct inputs, the central processing unit 50 may be provided with circuitry and/or logic for differentiating the input signals to provide calculated signals indicative of the rate of change of the various monitored devices, means to compare the input signals and/or memory means for storing certain input information, such as the direction of the last shift, and means for clearing the memory upon occurrence of predetermined events. Specific circuitry for providing the above-mentioned functions is known in the prior art and an example thereof may be seen by reference to above-mentioned U.S. Pat. No. 3,361,060 and/or by reference to a technical paper titled "The Automation of Mechanical Transmissions" published at pages 11–23 of Section IX of the published proceedings of a joint IEEE/SAE conference titled International Congress on Transportation Electronics, IEEE Catalog Number 84CH1988-5.

As is known, a purpose of the central processing unit 50 is to select, in accordance with predetermined logic rules such as a program (software and/or firmware) and current or stored parameters, the optimum gear ratio at which the transmission 14 should be operating and, if necessary, to command a gear change, or shift, into the selected optimum gear ratio. Ideally, an electronically controlled transmission can be programmed to enhance specific vehicle characteristics, such as fuel economy or performance. Selection of the D (on-highway drive) mode on the shift selector 52 by the driver indicates to the central processing unit 52 that peak performance is not required. In this mode, assuming transmission 14 provides nine selectable forward drive ratios ranging from about 12:1 to about 0.9:1, the gear selection subsystem may select fourth or fifth gear as a starting gear and select subsequent shifts, both upshifts and downshifts, according to what are referred to as the on-highway shift profiles which are intended to enhance fuel economy. Similarly, selection of the $D_1$ (off-highway drive) mode on the shift selector indicates to the central processing unit 50 a desire to operate at peak performance at the expense of fuel economy. In this mode of operation, the gear selection subsystem may select low gear or first gear as the starting gear in subsequent shifts, both upshifts and downshifts, at least in the lower gear ratios, will be according to what are referred to as the off-highway shift profiles which are intended to enhance vehicle performance at the expense of vehicle fuel economy.

A more detailed schematic illustration of the torque converter 20 and torque converter lock-up and disconnect clutch assembly 10 drivingly interposed engine 16 and automatic change gear transmission 14 may be seen by reference to FIG. 1. The torque converter assembly 20 is conventional in that it includes a fluid coupling of the torque converter type having an impeller 54 driven by the engine output or crank shaft 56 through a shroud 58, a turbine 60 hydraulically driven by the impeller and a stator or runner 62 which becomes grounded to a housing 64 via a one-way roller clutch 66 carried by a shaft 68 grounded to the housing 64. Shroud 58 also drives a pump 70 for pressurizing the torque converter, lubricating the transmission, selectively pressuring the transmission shifting mechanism 28 and/or power synchronizing mechanism 30 and/or operating the disconnect and by-pass clutches 24 and 26. Pump 70 may be of any known structure such as, for example, a well known crescent gear pump.

The transmission 14 includes an input shaft 72 driven by the engine 16 via the torque converter assembly 20 and/or lock-up and disconnect clutch assembly 10. Transmission input shaft 72 carries a connecting member 74 fixed thereto for rotation therewith. Connecting member 74 includes a portion 76 associated with the torque converter disconnect clutch 24 and a second hub portion 78 splined for association with the input shaft. Briefly, as will be described in greater detail below, torque converter disconnect clutch 24 may be engaged or disengaged, independently of engagement or disengagement of lock-up clutch 26, to frictionally engage or disengage a connecting member 79 which is associated with the torque converter turbine 60 and a member of the lock-up clutch 26, to and from the transmission input shaft 72 via portion 76 of connecting member 74. Torque converter lock-up clutch 26 may be frictionally engaged or disengaged, independent of the engagement or disengagement of disconnect clutch 24, to frictionally engage the engine crankshaft 56, and shroud 58 driven thereby, to the connecting member 79.

Engagement of torque converter lock-up clutch 26 will engage the engine crankshaft 56, via shroud 58, directly with the connecting member 79, regardless of the engaged or disengaged condition of torque converter disconnect clutch 24, and thus provides an effective lock-up for locking-up the torque converter 20 and driving transmission 14 directly from the engine 16 if disconnect clutch 24 is engaged. Additionally, at speeds above torque connector lock-up speed, the lock-up clutch 26 need not be engaged and disengaged during shifting as disengagement of clutch 24 disconnects the inertia of connection member 79 from input shaft 72.

If the torque converter by-pass clutch or lock-up 26 is disconnected, and the torque converter disconnect clutch 24 is engaged, the transmission 14 will be driven from engine 16 via the torque converter fluid coupling as is well known in the prior art. If the torque converter disconnect clutch 24 is disengaged, regardless of the condition of lock-up clutch 26, the transmission input shaft 72 is drivingly disengaged from any drive torque supplied by the engine or any inertial drag supplied by the torque converter, the engine and clutch 26. Disconnecting of the transmission input shaft 72 from the inertial affects of the engine, clutch 26 and/or torque converter allows the rotational speed of the input shaft 72, and all transmission gearing drivingly connected thereto, to be accelerated or decelerated by the transmission power synchronizer mechanism 30 in a more rapid manner for purposes of more rapidly achieving synchronization during a downshift or upshift of the transmission and also allows the power synchronizer 30 to cause the input shaft 72 to rotate at a rotational speed greater than any governed engine speed.

It is noted that transmission 14 is of the mechanical transmission type utilizing positive jaw type clutches. Positive clutches of this type are relatively compact and inexpensive as compared to frictional clutches and are very reliable if utilized in connection with some type of synchronizing means such as individual synchronizers and/or a power synchronizing mechanism. with positive type clutches, it is necessary and/or highly desirable that the driving torque and inertial forces on input shaft 72 be minimized when the jaw clutch members are to be disengaged from the previously engaged gear ratio and then re-engaged in the selected new gear ratio. Accordingly, when a fluid coupling such as a fluid torque converter is drivingly interposed between a drive engine and a positive mechanical transmission, it is important that a means to disconnect the transmission input shaft from the inertial effects of the fluid coupling and other inertial members be provided.

Figure 3A:
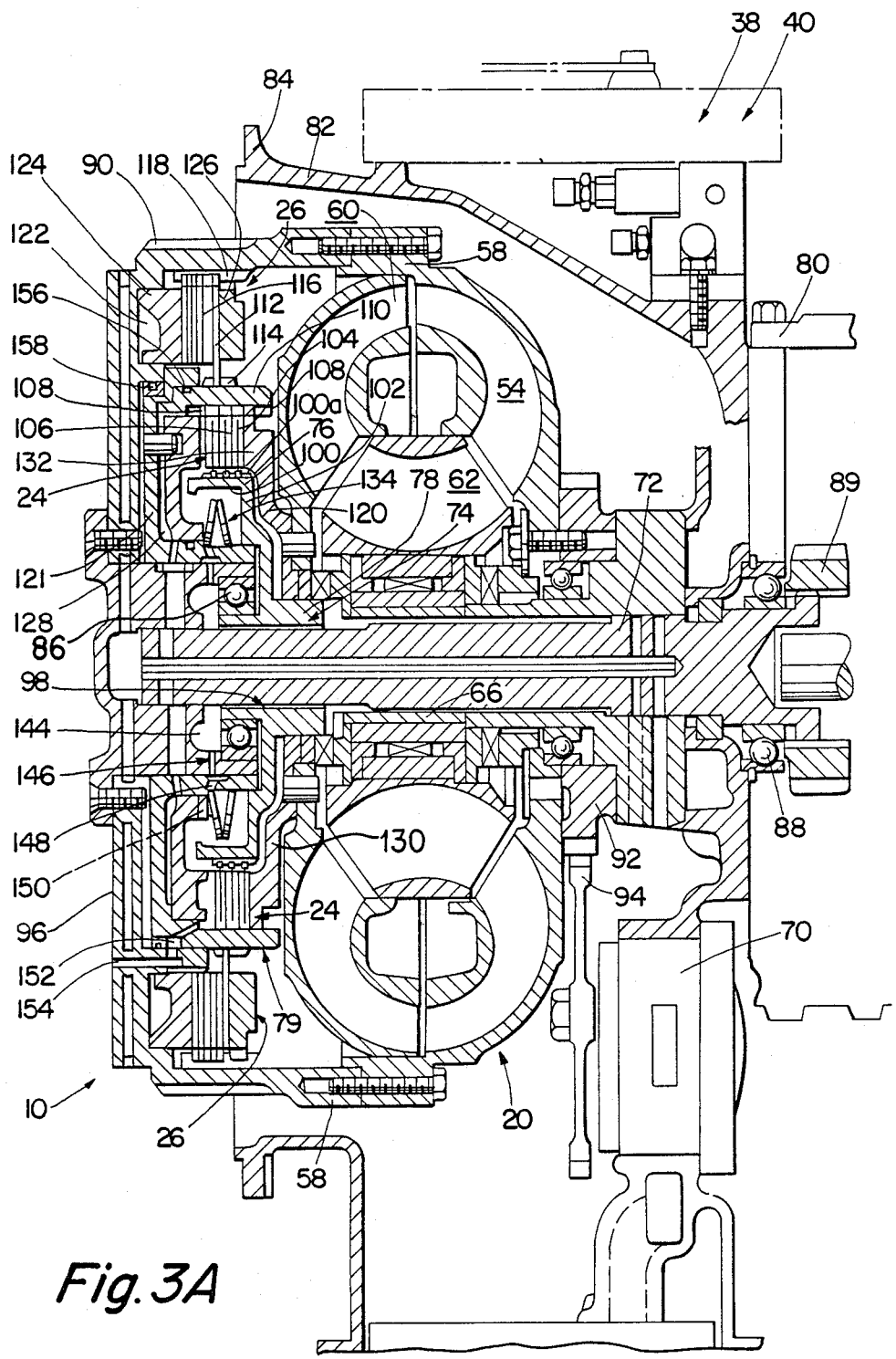
FIG. 3, which is shown in two portions, 3A and 3B, a partial view, in section, of the automatic mechanical transmission system of the present invention.
Figure 3B:
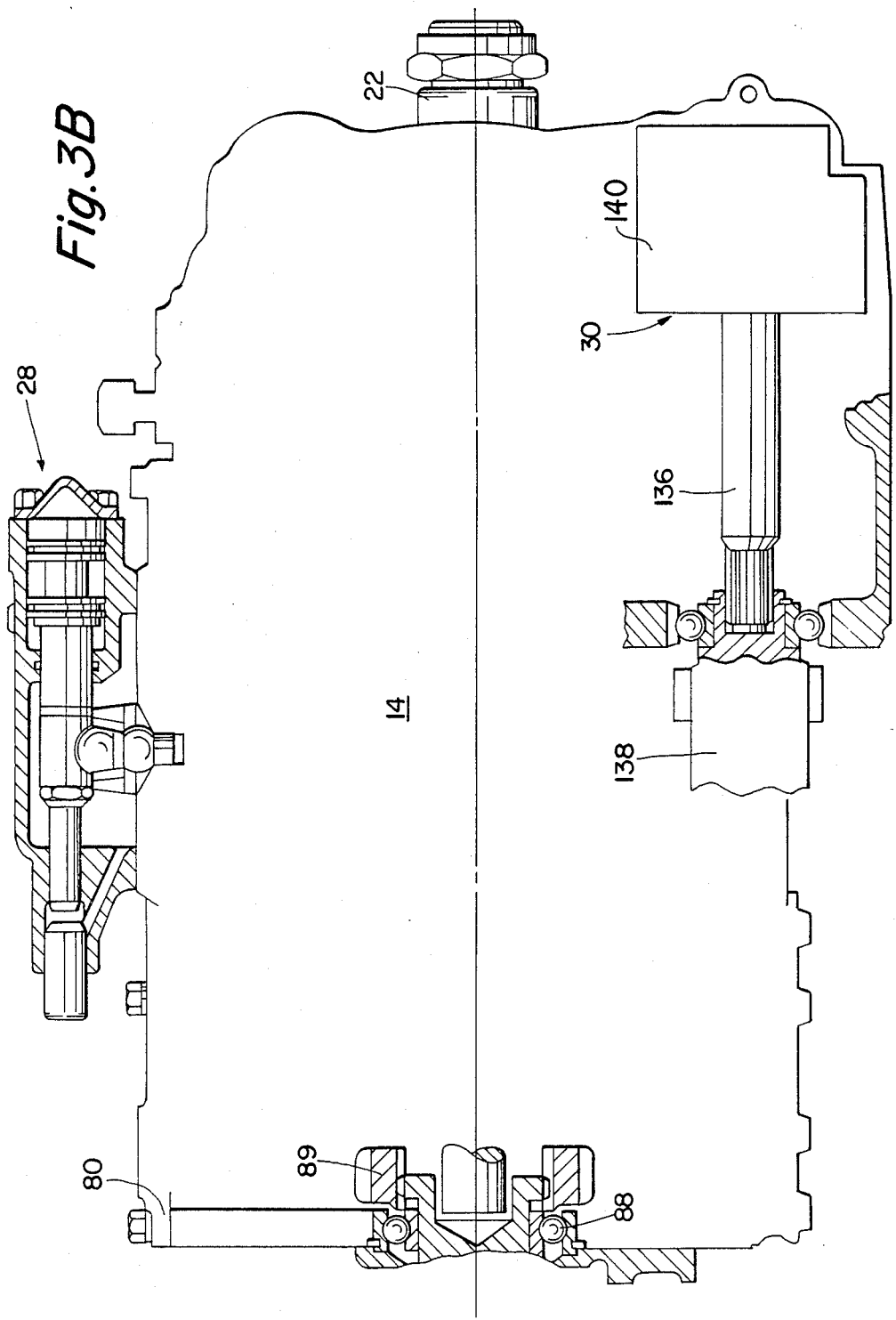

The specific structural details of a preferred embodiment of the torque converter and torque converter disengage and by-pass clutch assembly structure 10 may be seen by reference to FIG. 3. Change gear transmission 14 includes a transmission housing 80 having a bell housing portion 82 which encloses the torque converter 20 and disconnect and lock-up clutches, 24 and 26, and which is provided with a flange 84 for attachment to the drive engine. The housing 80 is provided with bearings 86 and 88 for rotatably supporting the input shaft 72 within the housing 80. Input shaft 72 carries transmission input gear 89 fixed for rotation therewith. As discussed above, torque converter 18 includes impeller 54, a turbine 60 and a stator 62 as is well known in the prior art. Stator 66 is supported in the housing by means of a one-way roller clutch 66 as is well known in the prior art. The impeller 54 is fixed for rotation to a shroud member 58 which is adapted to be driven by the engine 16 by means of engine drive splines 90, or the like, which are adapted for driving engagement with complimentary drive splines provided on the engine fly wheel. The gearing and positive clutch structure of transmission 14 is conventional and not illustrated nor described.

The shroud 58, which surrounds assembly 10 and torque. converter 20, is also adapted to drive pump 70 as by means of a spur gear 92 constantly engaged with pump drive gear 94. In addition to providing pressurized charging fluid for the torque converter 20, pressurized lubricant for the transmission 14 and actuating fluid for transmission actuating mechanisms 28 and 30, the pump 70 may also provide pressurized fluid for selective engagement and disengagement of the torque converter disconnect clutch 24 and/or torque converter by-pass clutch 26 as will be discussed in greater detail below. For this purpose, housing 80, shaft 72 and/or shroud end cover 96 are provided with fluid passage ways and rotary fluid connections in a manner well known in the prior art.

Torque converter disconnect and by-pass clutch structure 10 comprises a torque converter disconnect clutch 24 which is concentric with and generally surrounded by torque converter lock-up clutch 26 to provide a relatively axially compact structure. The torque converter lock-up and disconnect clutch structure 10 includes a connecting member 74 which is fixed for rotation with the input shaft 72 as at hub portion 78 splined connection 98. Connecting member 74 includes a generally axially extending annular shaped wall member 100 having and a plurality of outer diameter spline members 100a defining portion 76 and a radially extending portion 102 connecting portions 76 and 100. A plurality of friction members such as friction discs 104 are carried by splined member 100 and extend radially outwardly therefrom. Friction discs 104 are interleaved with friction discs 106 carried by internal splines 108 on axially extending annular portion 110 of connecting member 79 and extending radially inwardly therefrom to define a friction disc pack for disconnect clutch 24.

Friction discs 112 are carried by external splines 114 on portion 110 of connecting member 79 and are interleaved with friction discs 116 fixed for rotation on internal splines 118 fixed for rotation with the shroud 58 and extend radially outwardly therefrom to define a clutch disc pack for torque converter lock-up clutch 26. Member 79 is fixed to turbine 60 by means of web member 130. Connecting member 79 also includes an annular cup-shaped portion 121.

An annular axially inwardly extending cylinder 122 is defined in the forward end wall 96 of shroud 58 and receives an annular piston member 124 slidably and sealingly therein. Annular piston 124 and annular reaction member 126 receive the friction discs 112 and 116 axially therebetween for selective engagement and disengagement of lock-up clutch 26. Cylinder 122 may be selectively pressurized and depressurized, to engage and disengage, respectively, torque converter lock-up clutch 26 to connect the engine driven shroud 58 directly to the input shaft 72 via portion 110 of connecting member 79, if disconnect clutch 24 is engaged, by pressurized fluid from pump 70 supplied through passages in the cover 82, shaft 72 and/or end cover 96 and controlled by valve structure 40.

Connecting member 79, at portion 121, defines an annular axially inwardly extending cylinder 128 in which an annular piston 130 is sealingly and slidably retained. Annular piston 130 and annular reaction member 132, defined by a portion of member 79, receive the friction discs 104 and 106 axially therebetween for selective engagement and disengagement of the torque converter disconnect clutch 24. Pressurized fluid from pump 70 may be supplied to or vented from cylinder 128 by means of fluid passages defined in the hood 82, shaft 72 and/or end cover 96 and controlled by valve 38 controlling the flow of fluid to and from pump 70 to cylinder 128 or an hydraulic fluid reservoir (not shown). A Belleville spring 134 biases clutch 24 to a disengaged condition by resiliently biasing piston 130 leftwardly.

As may be seen, annular cylinders 122 and 128 may be individually and independently pressurized and/or vented for independent engagement or disengagement of the torque converter disconnect 24 and/or torque converter lock-up 26 clutches. By utilization of concentric and substantially telescopic clutches 24 and 26 in clutch assembly 10, a relatively axially compact structure is provided allowing a drive system comprising a torque converter fluid coupling to be drivingly interposed a drive engine and a mechanical change gear transmission wherein the transmission may be driven directly from the engine, the transmission may be driven by the engine through the torque converter fluid coupling and/or the transmission may be disconnected from the engine and torque converter for purposes of providing a break in the torque and reduction in input shaft inertia for purposes of more rapidly synchronizing and shifting the transmission.

When the vehicle is at rest with the mode selector in the drive or off-highway drive mode, the disconnect clutch 24 will be engaged and the lock-up clutch 26 disengaged allowing for torque converter start-up with its well known advantages. At above a given vehicle speed and/or gear ratio, the advantages of torque converter operation are no longer required, and the increased efficiency of a direct drive between the drive engine and transmission is required. Under these conditions, the torque converter lock-up clutch 26 will be maintained engaged allowing the transmission input shaft 72 to be driven directly from the engine via the torque converter shroud 58 and connecting member 79 when the disconnect clutch 24 is engaged.

As discussed above, clutch 24 will be disengaged to shift from a previously engaged gear to neutral, to allow the power synchronizer 30 to synchronize the jaw clutch members of the gear to be engaged and to allow engagement of the synchronized jaw clutches of the gear to be engaged.

Selection of the desired gear ratio and selection of the required engaged or disengaged condition of the torque converter disconnect or lock-up clutches, as well as the issuance of command signals to the various clutch and transmission operators is accomplished by the central processing unit 50 in a manner which is known in the prior art and which may be appreciated in greater detail by reference to above-mentioned U.S. Pat. Nos. 4,361,060 and 4,595,986.

The power synchronizing mechanism 30 may include a shaft 136 drivingly connected to a transmission countershaft 138 constantly in direct or indirect meshing engagement with the input gear 89 and input shaft 72. Shaft 136 may be selectively frictionally clutched to the housing 80 to decelerate the input shaft 72 and the gearing driven thereby and/or may be selectively frictionally clutched to a speed increasing drive train, such as a planetary speed increasing drive train, 140, driven off the output shaft 22, to accelerate the input shaft 72 and the gearing driven thereby. To achieve and/or maintain exact or substantial synchronization of the transmission jaw clutch members to be engaged, the clutching of the shaft 136 to the housing or to the gear train may be modulated as by pulse width modulation or the like.

Clutch 24, the disconnect clutch, is utilized as a master clutch as it is engaged and disengaged during shift transients for purposes of breaking torque and of decreasing input shaft inertia. Clutch 24 is operated as a wet clutch to increase the capacity and/or service life thereof. Accordingly, during disengagement of clutch 24, to minimize the inertia on input shaft 72, means are provided to quickly vent the clutch of lubricant upon disengagement of clutch 24 to minimize viscous drag on clutch plates 104.

Lubricant is present, from spline passages in the output shaft, in cavity 144 adjacent bearing 86. A radially extending passage 146 in cover 96 fluidly connects cavity 144 to a radially extending passage 148 in the connecting member cup-shaped portion 121. Passage 148 is normally closed at its radially outer outlet end by spring 134 in the disengaged position of clutch 24.

Upon engagement of clutch 24, Belleville, spring 134 is compressed axially rightwardly by cylinder 130 opening the outlet passage 148 and aligning radial slot 150 with passage 148 whereby lubricant will flow, under centrifugal force through passages 146, 148 and notch 150 to the clutch pack of clutch 24 and from there through passages 152 and 154 to a lubricant sump. Upon disengagement of clutch 24, Belleville spring 134 will again close passage 146 and, under the effects of centrifugal force, the clutch pack for clutch 24 will quickly vent. Accordingly, a relatively simple automatic mechanism is provided to allow lubricant flow to clutch 24 when engaged and to vent clutch 24 upon disengagement thereof.

Parallel seals 156 and 158 are located on both axial sides of venting passage 152 whereby the centrifugal forces of the lubricant on, and the ambient pressure on both axial sides of the clutch 24 assembly are balanced.

It is understood that the above description of the preferred embodiment is by way of example only and that various modifications, substitutions and/or rearrangements of the parts are possible without departing from the spirit and the scope of the present invention as hereinafter claimed.

We claim:

1. A torque converter and clutch structure (10) for a drive system of the type comprising a torque converter (20) drivingly interposed a prime mover (16) and an input shaft (72) of a mechanical change gear transmission (14), said torque converted having an impeller input member (54) adapted to be driving by said prime mover and a turbine output member (67) fluidly driven by said impeller input member, said torque converter and clutch structure characterized by:
   a first connecting member (74) adapted to be rotationally fixed to said input shaft;
   a second connecting member (79) adapted to be rotationally fixed to said input shaft;
   a first friction clutch (24) selectively engagable and disengagable to drivingly connect and disconnect, respectively, said first and second connecting members, said first friction clutch comprising at least one first friction member (104) carried for rotation with said first connecting member (74) and at least one second friction member (106) carried for rotation with said second connecting member;
   a second friction clutch selectively engageable and disengageable to drivingly connect and disconnect, respectively, said torque converter impeller input member (54) to said second connecting member, said second friction clutch comprising at least one third friction member (112) fixed for rotation with said second connecting member and at least one fourth friction member (116) fixed for rotation with said impeller input member;
   said first friction clutch providing the sole driving connection between said input shaft and said prime mover and the sole driving connection between said unput shaft and the turbine of said torque converter; and
   means (38, 40, 50) to independently engage and disengage said first and second friction clutches.

2. The structure of claim 1, wherein said second connecting member (79) comprises an axially extending generally tubular portion (110) defining an inner diameter surface (108) and an outer diameter surface (114), said second friction member (106) extends radially inwardly from said inner diameter surface and said third friction member (112) extending radially outwardly from said outer diameter surface, said third friction member frictionally engagable with said fourth friction member extending radially inwardly from a shroud member (58) fixed for rotation with said impeller to define said second clutch.

3. The structure of claim 1, wherein said second connecting member (79) comprises an axially extending generally tubular portion (110) defining an inner diameter surface (108) from which said second friction member (106) extends radially inwardly for selective friction engagement with said first friction member (104) extending radially outwardly from an exterior diameter surface (100a) on said first connecting member (74) to define said first clutch (24).

4. The structure of claim 3 further comprising a first generally radially extending fluid passage (146–148) having a radially inner inlet exposed to a supply of lubricant and a radially outward outlet opening radially inward of said first connecting member exterior diameter surface (100a), means for automatically opening and closing, respectively, said outlet in response to engagement and disengagement, respectively, of said first clutch, and a second lubricant passage (152-154) extending radially outwardly from an inlet radially outward of the inner diameter surface (108) of said second connecting member.

5. The improved structure of claim 4, wherein said transmission is automatic and includes shift actuators, a power synchronizer including a breaking for reducing the rotational speed of selective transmission members and driving means independent of the prime mover for increasing the rotational speed of selected transmission members and control means for selectively operating said first and second clutches, said shift actuator and said power synchronizer.

6. The structure of claim 5, wherein said impeller is driven by a shroud member surrounding said torque converter and said fourth friction members are rotationally fixed to said shroud member and extend radially inwardly therefrom.

7. The structure of claim 5 wherein said second lubricant passage includes a portion partially defined by a pair of axially spaced seals (156, 158), said portion located axial between said seals.

8. The structure of claim 4 wherein said second lubricant passage includes a portion partially defined by a pair of axially spaced seals (156, 158), said portion located axial between said seals.

9. The improved structure of claim 1, wherein said transmission is automatic and includes shift actuators, a power synchronizer including a braking means for reducing the rotational speed of selective transmission members and driving means independent of the prime mover for increasing the rotational speed of selected transmission members and control means for selectively operating said first and second clutches, said shift actuator and said power synchronizer.

10. The structure of claim 1, wherein said impeller is driven by a shroud member surrounding said torque converter and said converter and said fourth friction members are rotationally fixed to said shroud member and extend radially inwardly therefrom.

11. A torque converter and clutch structure (10) for a drive system of the type comprising a torque converter (20) drivingly interposed a prime mover (16) and an input shaft (72) of a mechanical change gear transmission (14), said torque converter having an impeller input member (54) adapted to be driven by said prime mover and a turbine output member (60) fluidly driven by said impeller input member, said torque converter and clutch structure characterized by:

a first connecting member (74) adapted to be rotationally fixed to said input shaft;

a second connecting member (79) rotationally fixed to said torque converter turbine member (60), said second connecting member (79) comprising an axially extending generally tubular portion (110) defining an inner diameter surface (108) and an outer diameter surface (114);

a first friction clutch (24) selectively engageable and disengagable to drivingly connect and disconnect, respectively, said first and second connecting members, said first clutch comprising at least one first friction member (104) carried for rotation with said first connecting member (74) and at least one second friction member (106) carried for rotation with said second connecting member and extending radially inwardly from said inner diameter surface;

a second friction clutch selectively engageable and disengageable to drivingly connect and disconnect, respectively, said torque converter impeller input member (54) to said second connecting member, said second clutch comprising at least one third friction member (112) fixed for rotation with said second connecting member and at least one fourth friction member (116) fixed for rotation with said impeller input member;

said third friction member (112) extending radially outwardly from said outer diameter surface and frictionally engageable with said fourth friction member extending radially inwardly from a shroud member (58) fixed for rotation with said impeller;

said first friction clutch providing the sole driving connection between said input shaft and said prime mover and the sole driving connection between said input shaft and the turbine of said torque converter;

means (38, 40, 50) to independently engage and disengage said first and second friction clutches, and means defining a first generally radially extending fluid passage (14614148) having a radially inner inlet exposed to a supply of lubricant and a radially outward outlet opening radially inward of said first connecting member exterior diameter surface (100a), means defining a second lubricant passage (152-154) extending radially outwardly from an inlet radially outward of the inner diameter surface (108) of said second connecting member, and means for automatically opening and closing, respectively, said outlet in response to engagement and disengagement, respectively, of said first clutch.

12. The improved structure of claim 11, wherein said transmission is automatic and includes shift actuators, a power synchronizer including a braking means for reducing the rotational speed of selective transmission members and driving means independent of the prime mover for increasing the rotational speed of selected transmission members and control means for selectively operating said first and second clutches, said shift actuator and said power synchronizer.

13. The structure of claim 12 wherein said impeller is driven by a shroud member surrounding said torque converter and said fourth friction members are rotationally fixed to said shroud member and extend radially inwardly therefrom.

14. The structure of claim 12 wherein said second lubricant passage includes a portion partially defined by a pair of axially spaced seals (156, 158) said portion located axial between said seals.

* * * * *